(12) United States Patent
LiVecchi

(10) Patent No.: US 6,823,515 B2
(45) Date of Patent: Nov. 23, 2004

(54) PERFORMANCE ENHANCEMENTS FOR THREADED SERVERS

(75) Inventor: Patrick Michael LiVecchi, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 09/852,366

(22) Filed: May 10, 2001

(65) Prior Publication Data

US 2001/0018701 A1 Aug. 30, 2001

Related U.S. Application Data

(62) Division of application No. 09/097,282, filed on Jun. 12, 1998, now Pat. No. 6,427,161.

(51) Int. Cl.[7] ................................................. G06F 9/00
(52) U.S. Cl. ......................... 718/105; 718/100; 718/102
(58) Field of Search ................................. 718/100, 101, 718/102, 105, 103; 709/200, 201, 202, 223, 234

(56) References Cited

U.S. PATENT DOCUMENTS

| | | | | |
|---|---|---|---|---|
| 5,752,031 A | * | 5/1998 | Cutler et al. ................ 718/103 |
| 5,805,804 A | * | 9/1998 | Laursen et al. ............. 709/223 |
| 5,826,081 A | * | 10/1998 | Zolnowsky ................ 718/103 |
| 5,925,098 A | * | 7/1999 | Freund et al. .............. 709/203 |
| 6,021,470 A | * | 2/2000 | Frank et al. ................ 711/138 |
| 6,023,722 A | * | 2/2000 | Colyer ....................... 709/201 |
| 6,075,791 A | * | 6/2000 | Chiussi et al. .............. 370/42 |
| 6,212,573 B1 | * | 4/2001 | Lim et al. ................... 719/315 |
| 6,298,386 B1 | * | 10/2001 | Vahalia et al. ............. 709/234 |
| 6,684,261 B1 | * | 1/2004 | Orton et al. ................ 719/328 |

FOREIGN PATENT DOCUMENTS

| | | | | |
|---|---|---|---|---|
| JP | 081163 | 4/1993 | ........... G06F/13/00 |
| JP | 152685 | 6/1995 | ........... G06F/15/00 |
| JP | 044366 | 2/1997 | ........... G06F/9/46 |
| JP | 198292 | 7/1997 | ........... G06F/12/00 |

\* cited by examiner

*Primary Examiner*—Majid A. Banankhah
(74) *Attorney, Agent, or Firm*—A. Bruce Clay; Marcia L. Doubet, Esq.

(57) ABSTRACT

A technique, system, and computer program for enhancing performance of a computer running a multithreaded server application. A scheduling heuristic is defined for optimizing the number of available threads. This heuristic alleviates over-scheduling of worker threads by defining a technique to wait to assign an incoming request to a currently-executing thread (upon completion of the thread's current work), instead of awakening a blocked thread for the incoming request. Provision is made to ensure no thread waits too long. Two stages are associated with a passive socket, so that a connection is only bound to a worker thread when work arrives for that connection. A new type of socket is defined, for merging input from more than one source and making that merged input available for scheduling. A giveback function is defined, for optimizing assignment of threads to incoming requests when persistent connections are used. Threads that go idle are put onto an idle queue, releasing them from a worker thread.

9 Claims, 9 Drawing Sheets

PERFORMANCE ENHANCEMENTS FOR THREADED SERVERS

RELATED APPLICATION

The present invention is a divisional of commonly-assigned U.S. Pat. 6,427,161 (Ser. No. 09/097,282, filed on Jun. 12, 1998), which is titled, "Thread Scheduling Techniques for Multithreaded Servers" and which is hereby incorporated herein by reference.

BACKGROUND OF THE INVENTION

1. Field of the Invention

The present invention relates to computer performance, and deals more particularly with a technique, system, and computer program for enhancing performance of a computer running a multithreaded server application. A scheduling heuristic is defined for optimizing the number of available threads. A 2-stage queue is defined for passive sockets, in order to ensure threads are not assigned to connections unless data is being sent. A new type of socket is defined, for merging input from more than one source and making that merged input available for scheduling. A function is defined for optimizing assignment of threads to incoming requests when persistent connections are used.

2. Description of the Related Art

A multithreaded application is a software program that supports concurrent execution by multiple threads—that is, a re-entrant program. A thread is a single execution path within such a program. The threads execute sequentially within one process, under control of the operating system scheduler, which allocates time slices to available threads. A process is an instance of a running program. The operating system maintains information about each concurrent thread that enables the threads to share the CPU in time slices, but still be distinguishable from each other. For example, a different current instruction pointer is maintained for each thread, as are the values of registers. By maintaining some distinct state information, each execution path through the re-entrant program can operate independently, as if separate programs were executing. Other state information such as virtual memory and file descriptors for open I/O (input/output) streams are shared by all threads within the process for execution efficiency. On SMP (Symmetric Multiprocessor) machines, several of these threads may be executing simultaneously. The re-entrant program may contain mechanisms to synchronize these shared resources across the multiple execution paths.

Multithreaded applications are becoming common on servers running in an Internet environment. The Internet is a vast collection of computing resources, interconnected as a network, from sites around the world. It is used every day by millions of people. The World Wide Web (referred to herein as the "Web") is that portion of the Internet which uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

The user working in a Web environment will have software running on his computer to allow him to create and send requests for information, and to see the results. These functions are typically combined in what is referred to as a "Web browser", or "browser". After the user has created his request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer. In order to enable many clients to access the same computer, the computer that receives and/or processes the client's request typically executes a multithreaded application. The same instance of the application can then process multiple requests, where separate threads are used to isolate one client's request from the requests of other clients.

This is an example of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture". This architecture places the Web server in the middle tier, where the added tier typically represents databases of information that may be accessed by the Web server as part of the task of processing the client's request. This three-tiered architecture recognizes the fact that many client requests are not simply for the location and return of static data, but require an application program to perform processing of the client's request in order to dynamically create the data to be returned. In this architecture, the Web server may equivalently be referred to as an "application server". When the server executes a multithreaded application program, the server may equivalently be referred to as a "threaded server, or "multithreaded server".

The server is responsible for the threads. The set of threads that have been created but not destroyed will be referred to herein as a "pool" of threads. The number of threads to be created for the pool is typically specified by a user (e.g. a systems administrator), as a configuration parameter when initializing the server. Typically, this parameter is set so that the server creates a large number of threads, in order to deal with the maximum anticipated connection load (i.e. the maximum number of incoming client requests).

The TCP/IP protocol (Transmission Control Protocol/Internet Protocol) is the de facto standard method of transmitting data over networks, and is widely used in Internet transmissions. TCP/IP uses the concept of a connection between two "sockets" for exchanging data between two computers, where a socket is comprised of an address identifying one of the computers, and a port number that identifies a particular process on that computer. The process identified by the port number is the process that will receive the incoming data for that socket. A socket is typically implemented as a queue by each of the two computers using the connection, whereby the computer sending data on the connection queues the data it creates for transmission, and the computer receiving data on the connection queues arriving data prior to processing that data.

For applications which receive requests from a number of clients, a special "passive" socket is created which represents a queue of pending client connections. Each client that needs the services of this application requests a connection to this passive socket, by using the same server port number (although communications using a secure protocol such as Secure Sockets Layer, or "SSL", typically use a different port number than "normal" communications without security, for the same application). The server accepts a pending client connection from the special passive socket. This creates a new server socket, which is then assigned to an available thread for processing.

A number of shortcomings exist in the current approach to implementing multithreaded server applications running in this environment, which result in less than optimal performance of those applications. With the increasing popularity of applications such as those running on Web servers, which may receive thousands or even millions of "hits" (i.e. client requests for processing) per day, performance becomes a critical concern. The present invention addresses these performance concerns.

In existing server implementations, a separate "dispatcher" thread is typically responsible for monitoring the queue which receives incoming connection requests for the passive socket for a given application. To differentiate between the thread doing the dispatching, and those threads to which it dispatches work, the latter are referred to herein as "worker threads". The dispatcher thread keeps track of the status of each worker thread, and assigns each incoming request to an available thread. An "available" thread is one that is ready to run, but has no work currently assigned to it. A thread in this state may equivalently be referred to as an "idle thread". When work is assigned to an idle thread, it is no longer considered idle, and no further work will be assigned to it until it has completed its current work request. On SMP machines, the dispatcher thread may become a bottleneck that prevents worker threads from being scheduled fast enough to keep all of the processors busy.

Alternatively, a server may be implemented without using a dispatcher thread. In this approach, the threads are responsible for checking the passive socket queue to determine if there are any connection requests. As each thread completes the work request it has been processing, it looks on the queue for its next request. If a request is waiting, the thread removes the request from the queue, and begins to process it. If no request is waiting, the thread becomes an idle thread. The idle thread may then "sleep", whereby a system timer is used to cause the thread to wait for a predetermined period of time, and then "awaken" to recheck the queue to see if work has arrived. This is referred to as "polling" mode. A more common alternative to polling mode is to use event-driven interrupts. In that approach, the thread will go into the idle state and wait for a system-generated interrupt that will be invoked when work arrives, signalling the thread to become active again. Going into the idle state is also referred to as "blocking", and being awakened from the blocked state (i.e. receiving the interrupt) is referred to as "unblocking".

In current server implementations that use event-driven interrupts, as each worker thread completes its current request, it checks the passive socket queue to see if any requests are waiting. When there is no waiting request, the thread blocks. Any number of threads may be blocked at a given time. When the next incoming request arrives, an event is generated to wake up the threads. Each blocked worker thread receives this interrupt, so each unblocks and tries to take the request from the queue. Only the first worker thread will be able to take the incoming request, and the others will again find the queue empty and return to the blocked state. However, a new API (Application Programming Interface) is under development to change this approach to interrupt generation. The API is referred to herein as "accept_and_receive". According to the accept_and_receive API, when an incoming request arrives, an interrupt will be generated only to a single blocked thread.

This new interrupt approach leads to the first performance problem to be addressed by the present invention, which will be referred to herein as "over-scheduling". When the number of incoming connections is less than the number of threads in the thread pool (i.e. the connection load is less than the maximum for which the server is configured), too many threads from the pool are used to service the workload. In other words, the thread pool is being over-scheduled. This leads to inefficient use of resources.

The following scenario illustrates the over-scheduling problem. Suppose all threads are blocked, waiting for connection requests. A first request arrives. The system scheduler wakes up one of these blocked threads, and assigns the incoming request to that thread. The thread begins processing the request. Then, a second request arrives, so the scheduler wakes up a second blocked thread and assigns this new request to it. The second thread begins processing this new request. The first thread completes the request it was working on, and checks the passive socket. Finding no new connection requests there, the first thread blocks. For two requests, the scheduler has awakened two threads.

However, it may be that thread one was nearly finished with its first request at the time the second request arrived. When this is the case, it would be more efficient to wait for the first thread to finish and find the second request when it checks the passive socket, as opposed to awakening the second thread. If the scheduler awakens a new thread for each incoming request (i.e. it over-schedules the threads), a thread working on a request is guaranteed to find the incoming connection queue empty when it completes its current request and checks for another. The threads will therefore block after each completed request. The repeated blocking and unblocking operations are expensive in terms of the overall pathlength for servicing a request. When a thread blocks, the scheduler will save the context information for that thread, and the thread will move from the "ready" state to the "blocked" state. The unblocking operation requires the fairly-significant overhead associated with interrupt processing.

A further impact on the system's performance during over-scheduling is caused by the memory paging mechanism. As a thread executes, it will refer to stored information. That information must be in memory to be processed. If it is not already in memory, it will be paged in. Typically, another page must be paged out to make room for the one being paged in. Paging mechanisms use algorithms to decide which page to page out. Commonly, the least-recently-used page is selected for paging out. When over-scheduling occurs, each thread blocks after it executes, and its pages therefore become unused. The longer a thread blocks, the more likely it becomes that its pages will be paged out. Then, when the thread is awakened, its pages must be paged back in, causing another thread's pages to be paged out. The extra processing caused by these paging operations reduces the efficiency of processing the incoming request.

Additionally, the operation of checking the passive socket, only to find it empty, is a wasted operation which further reduces the efficiency of the blocking thread.

A second performance problem will be referred to herein as the "multiple input source" problem. As previously stated, a server application may receive unsecure connection requests on one passive socket, and secure connection requests on a second passive socket. This will be the case, for example, in on-line shopping applications. The client shopper may request to display available products from an on-line catalog, eventually selecting some products to be ordered. Such requests for display of information are usually sent on an unsecure connection, so as not to incur the additional processing overhead associated with a secure connection. When the shopper places his order, he may choose to pay by credit card, and submit his credit card information electronically. This part of the transaction will be sent on the secure connection, in order to protect the shopper's information. Typically, the seller will use the same server application for the entire sequence of shopping transactions. The application must therefore be able to accept both unsecure and secure connection requests from the two passive sockets.

When a Web server is hosting more than one hostname, each hostname having its own IP address, a pair of passive sockets is used for each hostname. Thus, a given application may need to accept connections that arrive on many passive sockets. The set of such sockets is referred to herein as multiple input sources.

With the previously-discussed dispatcher thread approach to socket queue management, one dispatcher (or "acceptor") thread is allocated to each passive socket. When an incoming connection request arrives, these dispatchers are responsible for finding an available worker thread from the thread pool, and assigning an incoming request to the thread. As the number of dispatcher threads increases, the interference between them for managing the shared pool of worker threads also increases.

When dispatcher threads are not used, and the responsibility for checking the arrival queue belongs with the worker threads, the thread pool will be statically partitioned across the set of passive socket queues. Because the workload at any particular time, and the corresponding distribution of requests among the passive sockets, is unpredictable, it is very likely that this static partitioning will be less than optimal. One queue may have too few threads to handle its workload, and another may have too many. When too few threads are available, incoming requests have to wait on the queue, while available system capacity is left idle. Because an incoming request normally has a human waiting for the response, this type of delay in processing the response must be avoided to the greatest extent possible. When too many threads are available, the inefficiencies discussed previously for over-scheduling will result. A more dynamic partitioning, whereby the pool of worker threads is divided based on the current distribution of work among the passive sockets, cannot be accomplished by the server application because the depth of the connection queues on the passive sockets is not available to it.

A third performance problem will be referred to herein as "persistent connection scheduling". Persistent connection capability was introduced in version 1.1 of HTTP, and enables a single connection to be used for a stream of requests (and corresponding responses) between the client and server. Persistent connections are intended to reduce the amount of overhead associated with processing a series of requests, eliminating the set-up and tear-down costs of TCP connections that would otherwise be required for each individual request: instead, a single set-up and a single tear-down are used. Previously, each request generated at the client created a new connection, which lasted only for the duration of that request. An exchange of messages was required to set up the connection, and another exchange was required to close it. Many Web-based applications generate quite complex pages of information to display to users, and each page may require a number of separate requests to be sent through the network. For example, one request may be sent for each graphic image on the page, another for the static text, and yet others for any dynamically-generated text. Thus, for display of a single Web page, use of a persistent connection saves a great deal of processing overhead. That is, once a connection has been created for use between the two computers, the client may send any number of requests over that connection without stopping to wait for acknowledgement that the server has received each of those requests. This is referred to as a "stream" mode of sending requests. The server is required to respond to all requests from the stream in order. Either the client or the server may terminate the connection on any request boundary, without creating a protocol error.

In practice, the client software in the browser keeps this persistent connection open until the user moves to a different Web site (where a different server socket address, and therefore a new connection, will be needed). Some amount of time may pass between the last request sent on an open persistent connection, and when the user moves to the new site. The socket for the existing connection will have no incoming data during this time. The server application cannot know whether the socket is in this particular state (i.e the client is finished sending data, but the connection is still open), or whether the client simply has not generated its next request yet. Therefore, uncertainty exists at the server regarding reading the next request for this type of connection. There may be data on the queue, data that will arrive soon, or data that will not arrive for quite some time. And, any of these data packets may contain a client request for ongoing work on the connection, or a request to close the socket.

If data will arrive soon, it is most efficient to keep the connection bound to the worker thread, allowing the worker thread to go idle temporarily. However, if there will be a long delay before data arrives, it is more efficient to unbind the worker thread from this connection, and assign it to another request. Then, when the next request for the unbound connection arrives, a thread—most likely a different thread than the one to which it was originally bound—is assigned to continue the processing. There is no way to know in advance which connections will have long delays between any given requests, when those delays will occur, or how long they will last. Attempting to partition the pool of worker threads between those that will accept new connections, and those that will handle connections that reactivate after a delay presents a similar problem to that discussed above for the multiple input source problem: assigning too many threads, or too few threads, to either partition will result in inefficiencies.

Accordingly, a need exists for a technique by which these inefficiencies in the current implementations of multi-threaded server applications can be overcome. The proposed technique defines: a scheduling heuristic for optimizing the number of available threads; a 2-stage queue for passive sockets; a new type of socket, for merging input from more than one source and making that merged input available for scheduling; and a function for optimizing assignment of threads to incoming requests when persistent connections are used.

SUMMARY OF THE INVENTION

An object of the present invention is to provide a technique for enhancing the performance of multithreaded servers.

Another object of the present invention is to provide a technique whereby these performance enhancements are achieved by optimizing the scheduling of requests to worker threads.

It is another object of the present invention to provide this optimization by defining a scheduling heuristic that optimizes the number of available threads.

It is a further object of the present invention to provide this optimization by defining a new type of socket for merging input from more than one source, and making that merged input available for scheduling.

It is yet another object of the present invention to provide this optimization by defining a function that optimizes assignment of threads to incoming requests when persistent connections are used.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer-readable code implementing a software process for use in a computing environment having a connection to a network, for enhancing performance of a multithreaded application, comprising: a plurality of client requests for connections; a plurality of worker threads; a subprocess for receiving said plurality of client requests; and a subprocess for implementing a scheduling heuristic to alleviate over-scheduling of said worker threads. Further, a first group of said worker threads are active threads, said first group being comprised of changeable ones of said plurality of worker threads, and having a changeable number of said changeable ones, said changeable number being at least one; and said subprocess for implementing a scheduling heuristic further comprises a subprocess for balancing said changeable number in said first group against a current workload comprised of one or more of said plurality of client requests. Said subprocess for balancing may further comprise using an average delay, and also a maximum delay. Preferably, said average delay and said maximum delay are configuration parameters. In addition to said first group of worker threads, there may be a second group of said worker threads which are blocked threads (said second group being comprised of ones of said plurality of worker threads which are not in said first group), and which are stored in a Last-In, First-Out queue. Further, the present invention provides a system, method, and computer-readable code for enhancing performance of a multithreaded application, comprising: a subprocess for moving connections from a pending connections queue to a first queue when each of said connections are accepted; a subprocess for moving each of said connections from said first queue to a second queue when an initial data packet arrives for said connection; and a subprocess for assigning a worker thread to each of said connections on said second queue. Additionally, the present invention provides a system, method, and computer-readable code for enhancing performance of a multithreaded application, comprising: a subprocess for receiving input from multiple sources; and a subprocess for merging said received input onto a single queue for scheduling. Preferably, this further comprises: a subprocess for moving connections from a pending connections queue to a first queue when each of said connections are accepted; a subprocess for moving each of said connections from said first queue to said single queue when an initial data packet arrives for said connection; and a subprocess for assigning a worker thread to each of said connections on said single queue. Preferably, said subprocess for scheduling further comprises: a group of active worker threads comprised of changeable ones of a plurality of worker threads, and having a changeable number of said changeable ones, said changeable number being at least one; and a subprocess for implementing a scheduling heuristic for balancing said changeable number in said active group against a current workload comprised of said client requests stored on said single queue. Further, the present invention provides a system, method, and computer-readable code for enhancing performance of a multithreaded application, comprising: a plurality of persistent connections; a plurality of worker threads; a subprocess for binding selected ones of said persistent connections to selected ones of said worker threads, wherein an execution of said subprocess for binding results in a bound connection; and a subprocess for unbinding selected ones of said bound connections, wherein an execution of said subprocess for unbinding results in an unbound worker thread. Preferably, said subprocess for binding further comprises using a 2-stage queue; and said subprocess for unbinding further comprises using said 2-stage queue. Said subprocess for binding using said 2-stage queue further comprises: a subprocess for moving each of said persistent connections to said first stage when an initial data packet arrives for said connection; a subprocess for moving each of said persistent connections from said second stage to said first stage when data is received for said connection; and a subprocess for scheduling said persistent connections from said first stage; and said subprocess for unbinding using said 2-stage queue further comprises: a subprocess for moving selected ones of said bound connections from said first stage to said second stage when said selected bound connection goes idle; a subprocess for closing selected ones of said persistent connections in said second stage, responsive to a maximum idle period being exceeded; and a subprocess for making said unbound worker thread available to said subprocess for binding. Preferably, said subprocess for unbinding further comprises: a subprocess for closing further selected ones of said persistent connections in said second stage, responsive to exceeding a maximum number of idle connections.

The present invention will now be described with reference to the following drawings, in which like reference numbers denote the same element throughout.

DESCRIPTION OF THE PREFERRED EMBODIMENT

Figure 1:
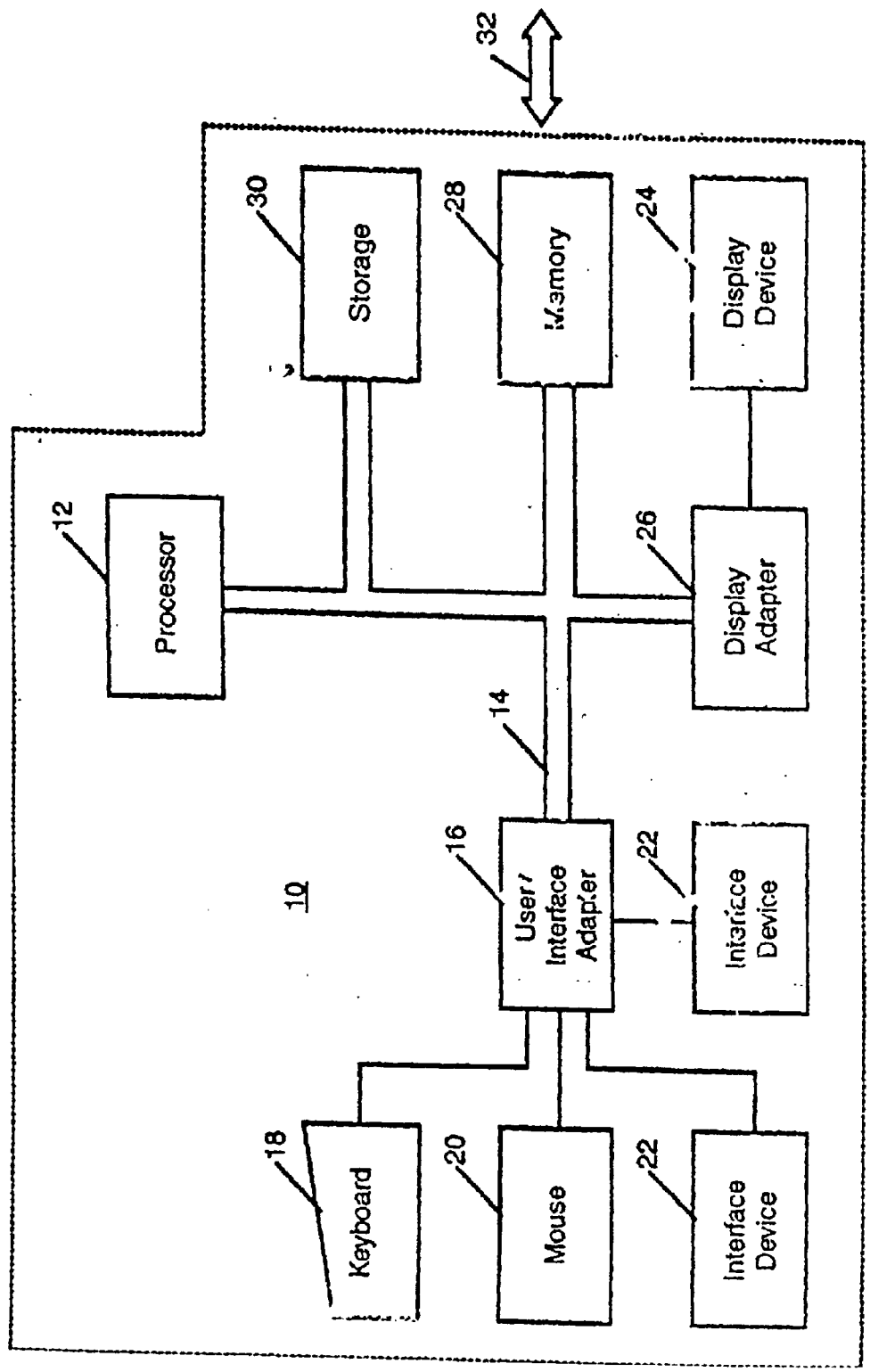
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 may alternatively represent a server in a networked environment. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
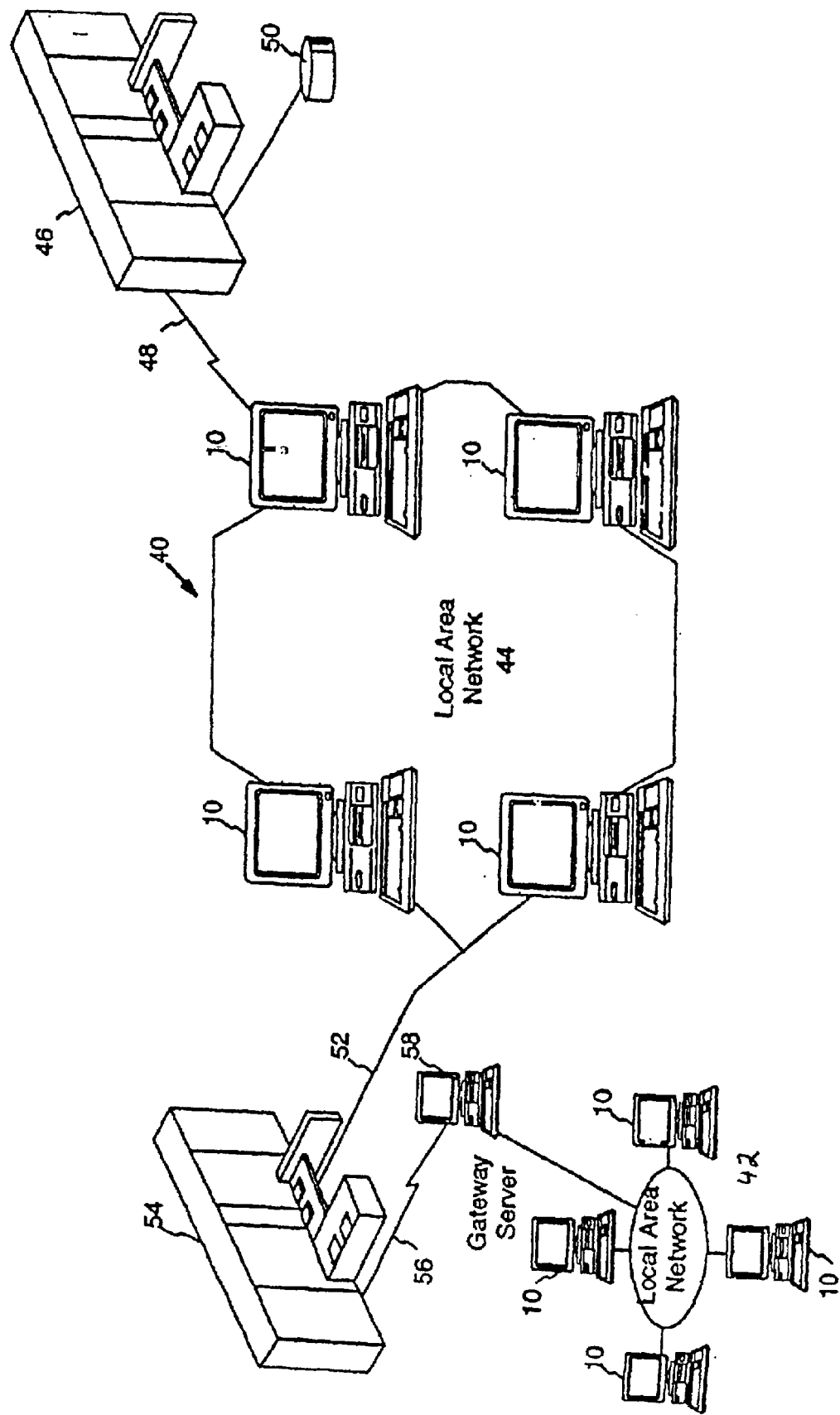
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370 or an Enterprise Systems Architecture/390 computer available from IBM, or any other type of mainframe computer. Depending on the application, a midrange computer, such a an Application System/400 (also know as an AS/400) may be employed. "Enterprise Systems Architecture/370" is a trademark of IBM; "Enterprise System Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention will typically be installed in a server such as server 46 in a client-server or three-tiered environment, where the server 46 processes requests that come from a user having a computer such as the workstation 10. The code will be typically be embodied in the server memory 28, and accessed by the microprocessor 12 using the bus 14. Alternatively, the code may be accessed from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. The techniques and methods for embodying software programming code in memory, on physical media, and/or distributing software code via networks are well known and will not be further discussed herein.

While servers in Web environments may not typically include a display device 24, the preferred embodiment of the present invention uses a display device 24 in order to allow configuration of parameters (for example, by a system administrator) that are required for the scheduling optimizations of the present invention.

The preferred embodiments of the present invention will now be discussed with reference to FIGS. 3 through 6.

In the preferred embodiments, the present invention is implemented as a computer software program. This program will be used where a client has sent a request for data to a server, and comprises part of the processing done on the server side of the network. The present invention operates with servers that perform application processing using multiple threads. Typically, the program will be used in an Internet environment, where the server is a Web server and the request is formatted using HTTP (or HTTPS). Alternatively, the connection may be to a corporate intranet (that is, a network owned or managed internally to the user's company) of which the user's computer is a component, where this corporate intranet provides services in a similar manner to the Internet. Use of the term "Internet" herein, when discussing processing associated with the user's request, includes processing that occurs in an intranet, unless otherwise stated. The program code of the preferred embodiment may be implemented as objects in an object-oriented programming language such as Smalltalk, or as functions or subroutines of a conventional procedure-oriented programming language such as "C".

Figure 3A:
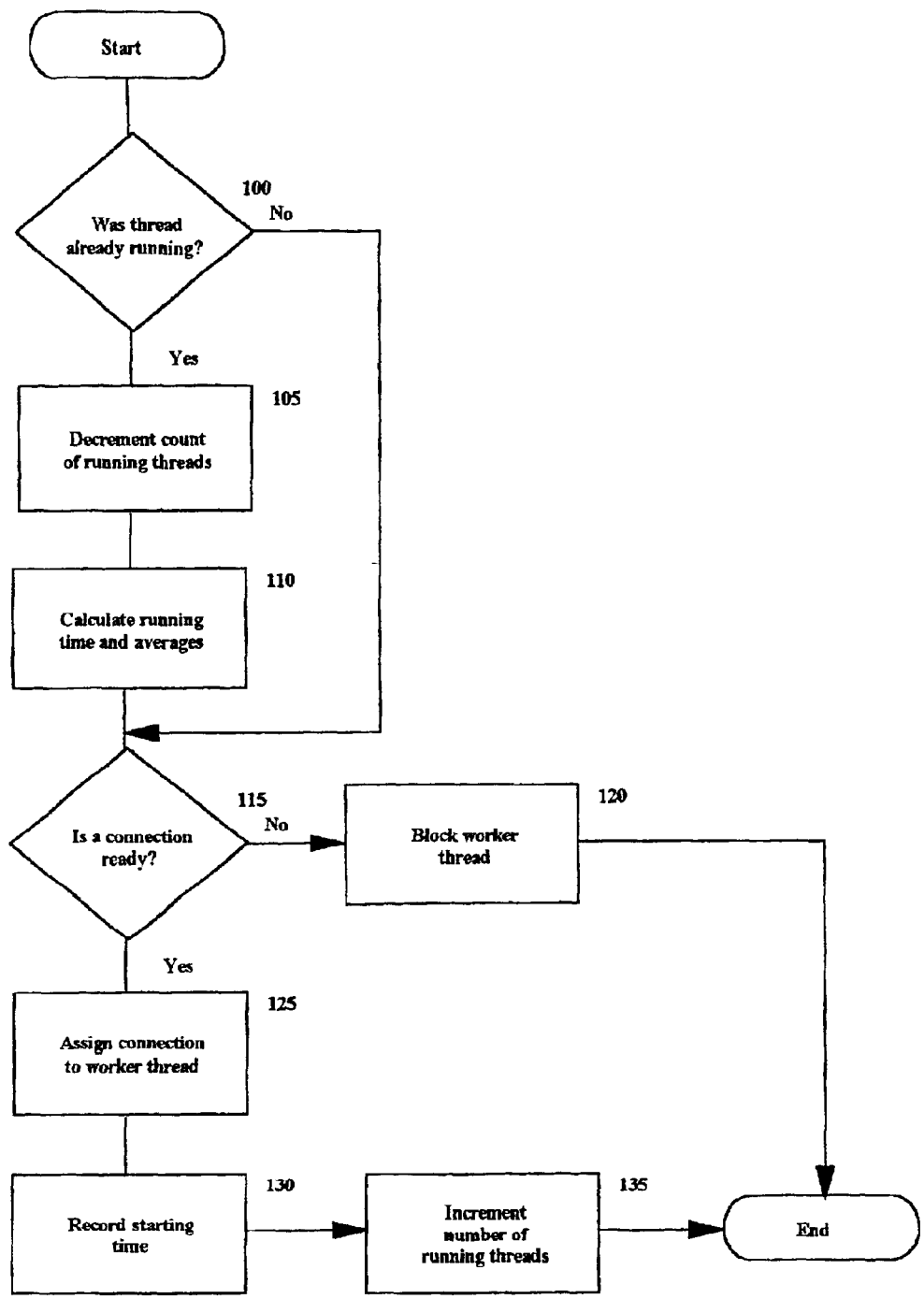
FIGS. 3A–3C illustrate flow charts which set forth the logic involved with the present invention to alleviate the over-scheduling problem.
Figure 3B:
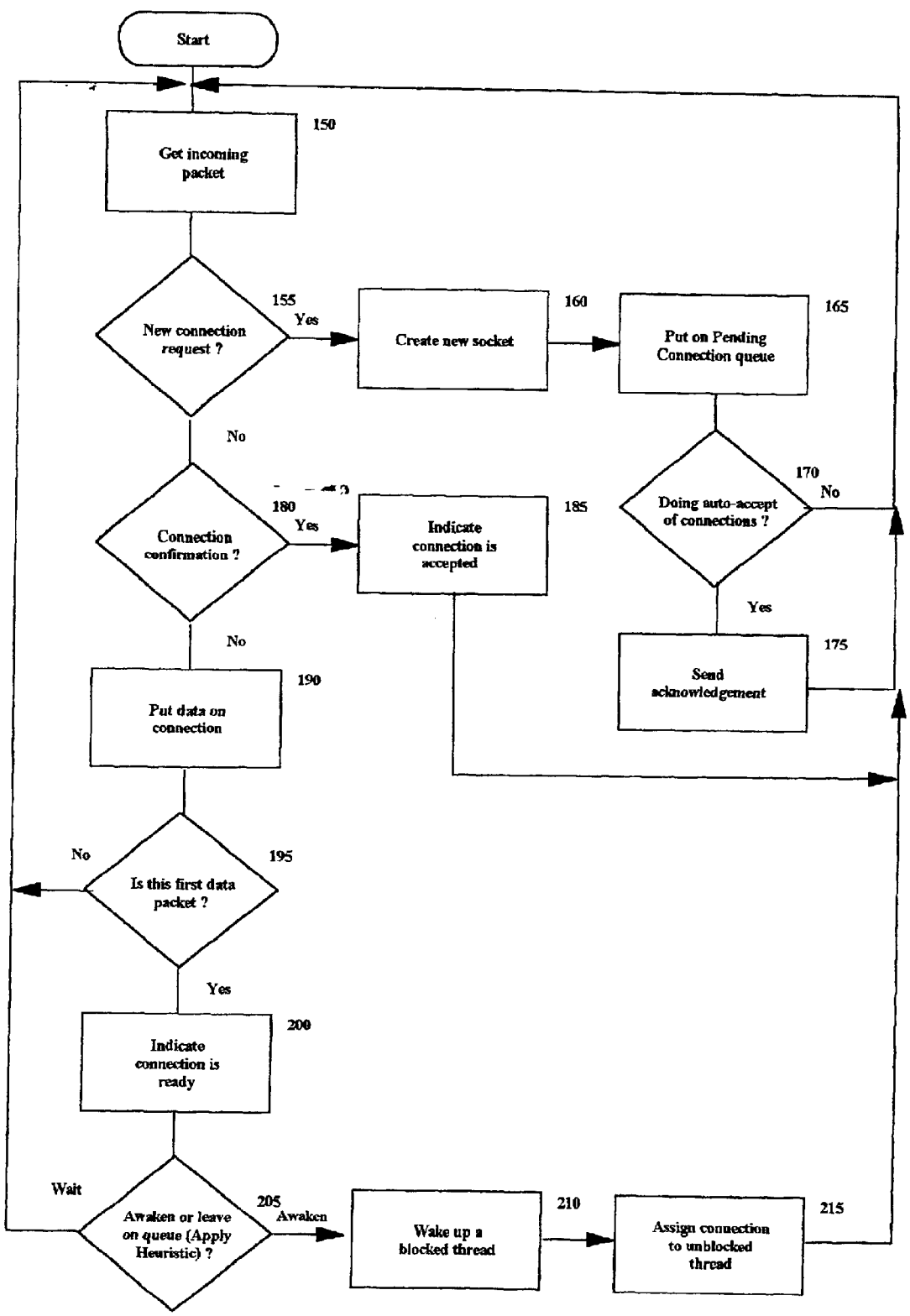
Figure 3C:
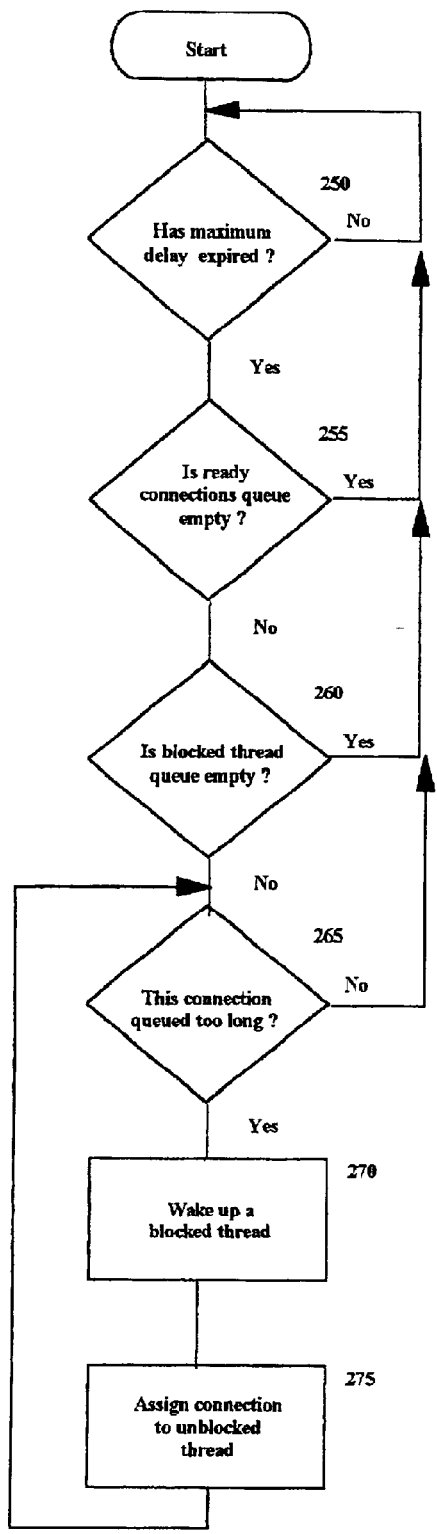

FIGS. 3A–3C illustrate flow charts which set forth the logic involved with a first preferred embodiment which alleviates the previously-discussed over-scheduling problem.

FIG. 3A represents the logic that is executed by a worker thread to determine whether there is a connection for which it might process requests. The process begins at Step 100, which asks whether this thread had already been processing a request prior to entering this logic. If the answer is negative, control transfers to Step 115. Otherwise, statistics will be gathered for the thread by executing Steps 105 and 110. Step 105 decrements a counter of the number of threads currently running. (This counter will have been initialized to zero when the server was initialized, and is referred to as "T" in the discussion of FIG. 3B.) Step 110 calculates the length of time the thread was running (using the starting time previously recorded at Step 130, when the thread was assigned to process the prior connection), and updates averages (which are further discussed with reference to FIG. 3B). Control then passes to Step 115.

At Step 115, a test is made to determine if there are any connections ready for processing by this worker thread. According to this preferred embodiment, connections are not assigned to worker threads until data has arrived on the connection. It may be that some clients will request connections, but then close that connection before ever sending a data request. By delaying the assignment of the connection to a worker thread until it is known that the client is sending data, this unproductive use of a worker thread is avoided. In order to differentiate accepted connections which have not received data from those that have, a 2-stage queue is defined. A connection (that is, the queue element for the connection) moves onto the first stage when it has been accepted (and the client has acknowledged the connection), and remains there until data arrives. This first stage may be referred to as the "accepted connections queue". Once a data packet arrives, the connection is moved to the second stage. This second stage may be referred to as the "ready queue". Worker threads are assigned only to connections that have reached the second stage. Preferably, the first stage is implemented as a first-in, first-out (FIFO) queue. However, because connections will be removed from the queue when data arrives for the connection, and not in a strictly FIFO manner, other structures (such as a linked list) may be used for storing the elements in the first stage. Preferably, the second stage is implemented as a FIFO queue, so that connections will be dequeued in the order in which they arrived on the queue. This approach makes it more likely that an individual connection will not wait an inordinate length of time, as compared to the other connections that are also waiting, before being scheduled for processing. It will be obvious to one of ordinary skill in the art that other mechanisms besides a 2-stage queue may be used for implementing this processing, such as associating state variables with the queued elements to indicate each connection's status, without deviating from the inventive concepts of the present invention.

If the test at Step 115 has a negative response (i.e. there are no connections waiting to be assigned to worker threads), control transfers to Step 120, where the worker thread becomes blocked. The process of FIG. 3A then ends for this worker thread. The worker thread will be unblocked according to the logic described below for Step 210 of FIG. 3B or Step 270 of FIG. 3C.

In this first preferred embodiment, the blocked worker threads are kept in a queue, which may be referred to as a "blocked thread queue". Preferably, this queue is implemented as a Last-In, First-Out (LIFO) queue. By putting a blocking thread into a LIFO queue, it is more likely that the thread's pages will still be resident in memory when the thread is unblocked, assuming the paging mechanism uses a least-recently-used scheme for replacing pages when bringing new pages into memory. The thread that blocks at Step 120 is enqueued at the head of this blocked thread queue.

Control reaches Step 125 when there was a connection ready at the test in Step 115. This connection is then assigned to the worker thread. The socket structure which contains the connection's data request(s) will be taken from the ready queue, and passed to the thread.

Step 130 records the current time as the time at which this thread started processing this connection, and Step 135 increments the counter of running threads. This is done to enable collection of execution statistics, to be used later in the scheduling heuristic. The process of FIG. 3A then ends.

When worker threads are executing the accept_and_receive API on a passive socket, it is execution of this API call that invokes the processing of FIG. 3A. However, FIG. 3A is not limited to use with this API, and its logic may be invoked in other ways (for example, by executing a function call for a similar accept-connection functionality).

The connection assigned to a worker thread by FIG. 3A will be processed according to techniques which do not form part of the present invention. When the processing has completed, the thread may again request another connection (unless the server is stopping, for example) using the process of FIG. 3A.

FIG. 3B represents the logic that is executed by a process such as a network I/O interrupt handler, to process incoming packets that arrive on a passive socket.

The process begins at Step 150, with receipt of an incoming packet. Step 155 tests whether this packet is a request for a new connection. If it is, control transfers to Step 160; otherwise, control transfers to Step 180.

At Step 160, a new socket is created, using techniques which are known in the art, which results in creation of a new socket data structure. Step 165 puts an entry for this connection on the "pending connections" queue for the passive socket.

Step 170 tests whether connections on this passive socket are to be automatically accepted. A configuration parameter may be used to indicate this information. By automatically accepting incoming connection requests, scheduling of the request to a worker thread can be delayed until data has arrived. If this test has a negative response, then the 2-stage queue of this embodiment is not used. This allows compatibility with existing implementations, which may implement other features of the present invention. The connection remains on the pending connections queue. Otherwise, an acknowledgment will be sent to the client at Step 175. Control then returns to Step 150 to await the next incoming packet.

Step 180 asks whether the incoming packet was a confirmation of the connection. If it was, then Step 185 marks the connection as "accepted". Using the 2-stage queue of this preferred embodiment, this comprises moving the entry for this connection from the "pending connections" queue to the "accepted connections" queue, which is the first of the two stages. Control then transfers to Step 150 to await the next incoming packet.

Control reaches Step 190 when the incoming packet was not a connection request or a connection confirmation, For ease of reference, FIG. 3B assumes that the packet was a data packet. Other packet types are not pertinent to the execution flow of FIG. 3B, and are therefore not addressed. It will be obvious to one of ordinary skill in the art that additional logic may be added for these packets, without deviating from the inventive concepts of the present invention. At Step 190, this data packet is put onto the appropriate socket's inbound queue. A test is made at Step 195 to determine whether this is the first incoming data packet for this connection. If not, then the interrupt handler does no further processing of this packet (because the connection has already been assigned to a worker thread), and control returns to Step 150.

At Step 200, the first data packet for an accepted connection has arrived. Therefore, this connection can be made available for scheduling to a worker thread. Using the 2-stage queue of this preferred embodiment, the processing of Step 200 comprises moving the connection from the "accepted connections" queue (stage 1) to the "ready" queue (stage 2).

At Step 205, a novel scheduling heuristic defined by the present invention is used to determine whether to unblock a waiting thread to process this connection, or wait for a currently-running thread to complete (that is, leave the connection on the ready queue for now). If the outcome of the heuristic indicates that a blocked thread should be unblocked, control transfers to Step 210 (by following the "Awaken" branch from Step 205). Otherwise, it is not yet necessary or desirable to unblock a waiting thread for processing this connection, so the interrupt handler does no further processing at this time, and control returns to Step 150 (by following the "Wait" branch from Step 205).

The scheduling heuristic that is performed at Step 205 is defined by the following mathematical expression:

$$R=(C*T*D)-(T/2)$$

The objective of this scheduling heuristic is to balance the number of worker threads against the current incoming workload. Optimum results are achieved when over-scheduling does not occur. To do this, a small backlog should be maintained on the incoming ready queue (that is, some connections should be allowed to remain on the queue, and not be immediately assigned by awakening a worker thread). However, the connections should not be allowed to remain on the queue beyond some short acceptable delay period. If no worker thread is available at the end of that delay period, then a blocked worker thread will be awakened so as not to exceed the acceptable delay. Preferably, the length of this delay will be comprised of two parts, an average acceptable delay and a maximum acceptable delay. Optionally, these delay factors are configuration parameters, for which values are entered by a user. The manner in which values for configuration parameters are entered by users is well known to one of ordinary skill in the art, and will not be described in detail herein. Typically, a configuration menu will be displayed during initialization of the server, and these parameters will be included on that menu.

In this expression, R represents the target number of ready connections on stage 2 of the 2-stage queue, which may also be referred to as the "queue depth" or "queue backlog". If the number of connections is greater than or equal to R when the test at Step 205 is made, then too many connections are already waiting, according to the current parameters, so a waiting thread will be unblocked by transferring control to Step 210. If the queue depth is less than R, then all the connections remain on the queue, waiting for running threads to finish. Because all the connections are remaining on the queue, processing transfers back to Step 150.

The variable C in the scheduling heuristic represents the average number of connections per second that one worker thread can complete. The value of this variable is computed by collecting execution data for the threads. Execution data collection is performed according to the processing described earlier for FIG. 3A. Until the server application has been executing for some period of time, representative data does not exist. Therefore, the value of C is initialized to zero, causing R=0 so that control will transfer from Step 205 to Step 210 (unblocking a waiting thread).

The variable T represents the number of currently running threads. Thus, the number of requests that complete in one second is (C * T). For example, if a thread can complete an average of 8 requests per second, and there are 10 threads currently running, then these threads can complete an average of (8 * 10)=80 requests every second.

The variable D represents the average acceptable delay time for a request to wait on the queue. The average rate at which new connections are absorbed by the thread pool (i.e. the connections are assigned to worker threads) during the delay time D is (C * T * D). For example, if the average acceptable delay time is 0.2 seconds, then (using the numbers from the example above) 16 requests can be absorbed by this number of threads during this delay period: if 80 requests can be completed in 1 second, then (8 * 10 * 0.2) 16 requests can be completed in 0.2 seconds At any given time, an average of half the threads that are running are completing their current request and beginning another. The scheduling heuristic accounts for this with the term (T/2). This value is subtracted from (C * T * D) because those threads that are just beginning a new request are not actually available for taking on new requests within the average completion period of (1/(C/2)) seconds: they will be available after (1/C) seconds. Continuing the example above, the value to be subtracted is (10/2)=5, so that the end result for R is (16−5)=11.

In other words, a system fitting the parameters of this example can handle up to (C * T * D)−(T/2)=11 new requests every D=0.2 seconds by waiting for running threads to complete and assigning the new requests to those T=10 threads as they become available—and the requests do not have to wait on the queue longer than an average of D=0.2 seconds. If more than 11 new requests arrive, on average, during the period D=0.2 seconds, then the capacity of the system is exceeded and a waiting thread must be unblocked to ensure that the delay for any given request does not exceed D.

While this embodiment describes the novel scheduling heuristic used to determine the scheduling of connections from a 2-stage queue, the scheduling heuristic may alternatively be used without such a queue, without deviating from the inventive concepts of the present invention. That is, this heuristic can be used with existing passive sockets to schedule connections which have been accepted but have not yet received data, provided statistics are gathered as described in FIG. 3A. In this approach, many (although not all) of the advantages of this first preferred embodiment will be realized. There remains the possibility that some connections will be scheduled to worker threads, only to be closed before the client sends data on the connection. However, the over-scheduling problem will be alleviated.

Similarly, the 2-stage queue defined in this preferred embodiment may be used advantageously without using the novel scheduling heuristic. In that situation, any scheduling approach may be used for the connections on the second stage, including scheduling each connection immediately upon reaching the second stage—even if a worker thread must be unblocked each time. While this approach will still result in some overscheduling of threads, the overscheduling will be limited to those connections that have data ready to be processed.

At Step 210, a waiting thread is unblocked. This thread is assigned to process the request at the head of the stage 2 "ready" queue at Step 215. Control then returns to Step 150. The manner in which a thread is unblocked, and assigned to a request, is well known to one of ordinary skill in the art, and does not form part of the present invention. For example, when a thread blocks (at Step 120 of FIG. 3A) by issuing a "WAIT", the thread may be unblocked by issuing a "POST" or "NOTIFY" event. When the accept_and_ receive API is used, causing the WAIT, this POST will unblock a single thread. When an API other than accept_ and_receive is used, issuing a POST command may unblock all threads that are waiting, as previously discussed.

FIG. 3C illustrates the logic that may be executed by a delay monitor, to ensure that no connection waits too long before being scheduled to a worker thread. This logic will be performed periodically, and will be invoked using a timer.

The process begins at Step 250, which represents checking for expiration of a "maximum delay" timer. While this is shown as a repeating loop at Step 250, it will be obvious to one of ordinary skill in the art that this checking does not occur uninterrupted. Typically, a timer process of duration "maximum delay" will be scheduled, which causes the timer to begin ticking. Once the maximum delay period has expired, an interrupt will be generated for the tinier process, enabling the logic of Steps 255 through 275 to be processed. Alternatively, the checking may be performed more or less often than the maximum delay time, in which case the test in Step 250 would reflect a different time interval.

A test is made at Step 255 to see if the stage 2 "ready" queue is empty. If it is, then no connections have been waiting too long, so control returns to Step 250 to await the next timer expiration. Otherwise, Step 260 tests to see if the blocked threads queue is empty. If this test has a positive response, then no more threads are available, so the entries on the ready queue will not be checked. Control returns to Step 250. When Step 260 has a negative response, the connections on the queue will be checked to see if any has been waiting too long. Steps 265 through 275 represent a repeating loop that performs this checking. At Step 265, the oldest request on the queue (the connection pointed to by the head-of-queue pointer) is checked to see if it has waited longer than the maximum acceptable time. If it has, then Step 270 will unblock a waiting thread, and Step 275 will assign the connection to that thread. The next oldest connection is then checked by returning control to Step 265. When the ready queue is implemented using a FIFO queue, and the test at Step 265 is negative, then none of the remaining queued connections have exceeded the maximum delay, and control returns to Step 250. (If a FIFO queue was not used, then it will be necessary to check each entry on the ready queue, by repeating Steps 265 through 275 until reaching the end of the queue.)

Figure 4:
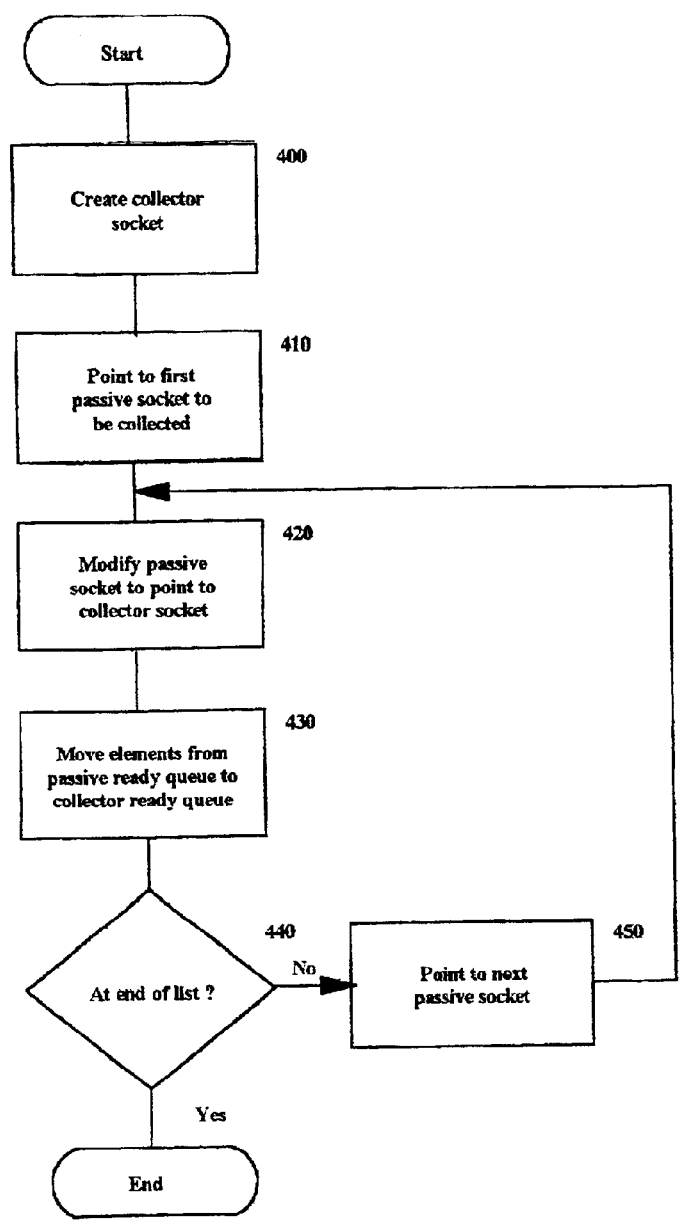
FIG. 4 illustrates a flow chart which sets forth the logic involved with the present invention when input is merged from more than one source, in order to make this merged input available for scheduling.

FIG. 4 illustrates a flow chart which sets forth the logic involved with a second preferred embodiment which alleviates the previously-discussed multiple input source problem.

The second preferred embodiment is based on definition of a new type of socket, called a collector socket. Input from multiple passive sockets is merged onto a collector socket, so that a single source is available from which to schedule connections to threads. A collector socket is implemented as having the second stage "ready" queue of the 2-stage queue described in the first preferred embodiment, where the first stage "accepted connections" queues remain associated with the multiple passive sockets. Connections are queued on the accepted connections queues of the passive sockets upon being accepted, and moved to the ready queue of the collector socket when the first data packet for each connection arrives.

Figure 5A:
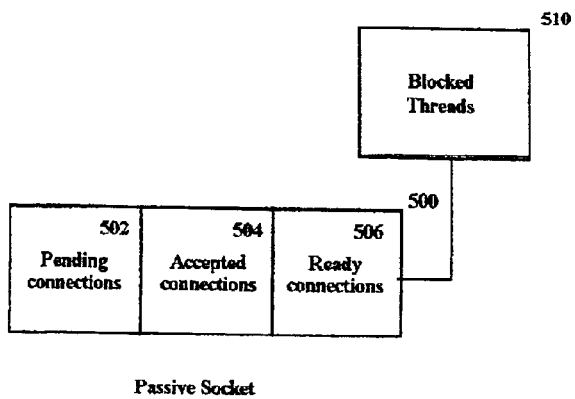
FIGS. 5A–5B depict conceptual representations of the multi-stage queues used by the present invention.

FIG. 5A depicts a conceptual representation of the 2-stage queue of the first preferred embodiment, for comparison to the changes required for using a collector socket. In FIG. 5A, a passive socket 500 is depicted. There may be many such passive sockets, each of which has: (1) a pending connections queue 502 where socket structures are maintained while a connection is still pending; (2) an accepted connections queue 504 where socket structures are maintained after the connection has been accepted, and before the first data packet has arrived for the connection; and (3) a ready connections queue 506, where socket structures are maintained after at least one data packet has arrived, and before the connection has been scheduled to a worker thread. Each passive socket has associated with it a blocked thread queue 510, with which connections are scheduled to threads according to the techniques previously discussed.

Figure 5B:
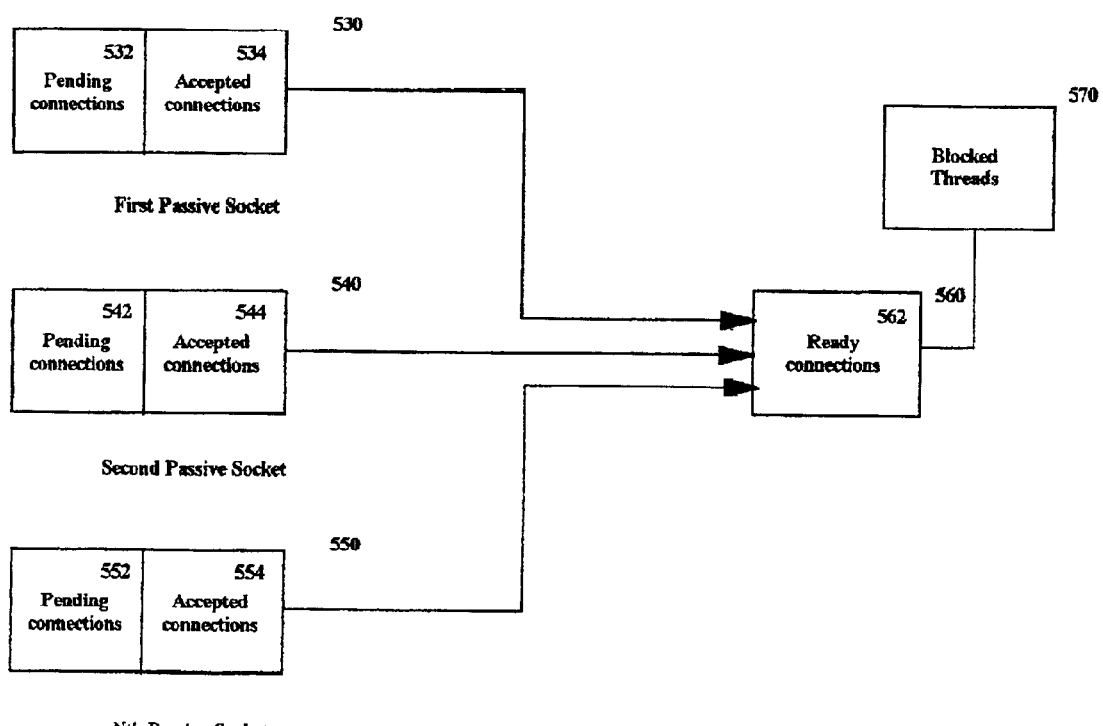

In contrast, FIG. 5B illustrates how the passive sockets differ when using collector sockets. Three passive sockets 530, 540, 550 are shown in FIG. 5B as having their data merged onto one collector socket 560 (although the number to be merged is not limited to three). Each passive socket 530, 540, 550 is now comprised of 2 queues: (1) a pending connections queue 532, 542, 552; and (2) an accepted connections queue 534, 544, 554. The ready queue 562 is now associated with the collector socket 560. Further, instead of having a blocked thread queue 510 for each passive socket 500, there is now a single blocked thread queue 570 associated with the single collector socket 560. As shown in FIG. 5B, when connections move from the accepted connections queues 534, 544, 554, they are moved to the ready queue 562 of the collector socket 560.

An additional API is required to enable use of collector sockets. The purpose of this API is to indicate which passive sockets are to be merged onto the collector socket. Thus, the API call provides a list of passive sockets that are to be collected. Preferably, this information is communicated using a configuration parameter, where a user such as a systems administrator is prompted to specify the passive socket identifiers. Other ways of making this information available may be used without deviating from the inventive concepts of the present invention. These identifiers are then made available to the second preferred embodiment. It will be obvious to one of ordinary skill in the art how configuration parameters can be obtained from a user, and made available to an executing program. Therefore, this will not be described in detail.

Preferably, the collector API call will be issued when the server begins operating. However, some delay may exist between the time clients begin sending requests to the server, and when the collector socket has been established. FIG. 4 describes logic that may be used to remedy this situation, checking the passive sockets that are to be collected to find any connections that may have already been moved to the ready queue of the passive socket. These connections will be transferred to the ready queue of the collector socket. The logic of FIG. 4 may also be used if the collector API is invoked after the server has already begun executing.

At Step 400, the collector socket is created, in response to receiving the API call. The ready queue will be initialized to an empty queue. Statistics kept for the scheduling heuristic (described above) are initialized, in order to begin keeping statistics about execution of the collector socket and threads using this socket. A queue of blocked threads is created for the collector socket, for threads that will be used to process connections from this socket.

Step 410 points to the first passive socket identifier from the list provided on the API call, using a pointing mechanism such as an index or loop counter. Techniques for indexing through the entries in a list are well known in the art, and will not be described further.

Step 420 modifies the passive socket currently pointed to, causing it to point to the collector socket. This enables connections that later receive data on the passive socket to have the data packets forwarded to the collector socket.

Step 430 checks the passive socket's ready queue, to see if this connection had already been moved to that ready queue. As described above, the first data packet for an accepted connection may have arrived before the collector socket was created, and Step 430 provides for moving such a connection to the ready queue of the collector socket. Techniques for removing entries from queues, and placing entries on queues, are well known in the art.

Step 440 tests to see if all the passive sockets identified on the collector API have been processed, by checking to see if the pointer points to the last element in the list. If this test has a positive response, then the processing of FIG. 4 ends. Otherwise, Step 450 increments the pointer to point to the next passive socket, and control returns to Step 420.

The processing logic by which worker threads receive work from the collector socket ready queue is identical to the process shown in FIG. 3A for threads that receive work from the passive socket ready queues. However, the following differences exist from the prior description of FIG. 3A: (1) the statistics being kept are kept for the collector socket; (2) the queue of blocked worker threads is the queue associated with the collector socket; (3) the ready queue being checked is the ready queue of the collector socket; and (4) the worker threads are executing the accept_and_receive API on the collector socket.

The processing logic with which the receipt of incoming packets at the passive sockets is handled for this preferred embodiment is similar to that shown in FIG. 3B. However, a small number of changes are required. After Step 195 detects the first data packet arriving for a passive socket that is being merged onto a collector socket (i.e. the "Yes" branch of Step 195), the connection is moved to the ready queue of the collector socket instead of the ready queue of the passive socket. The statistics used for the scheduling heuristic at Step 205 are those of the collector socket. The thread awakened at Step 210 is a thread from the blocked thread queue associated with the collector socket.

The processing logic with which the ready connections queue of the collector socket is monitored, to ensure that no connection waits too long before being scheduled, is the same as that shown in FIG. 3C. However, the following differences exist from the prior description of FIG. 3C: (1) the ready connections queue being monitored is that of the collector socket, as stated; (2) the blocked thread queue being checked is the one associated with the collector socket; and (3) the threads awakened at Step 270 are from the blocked thread queue associated with the collector socket.

Information must be passed along with the accepted connections as they are moved from the passive sockets to the collector socket (as described with reference to FIG. 3A), indicating which passive socket that connection arrived on. This is due to the fact that different processing may be required for input from different sources. For example, if a secure connection request arrived on one passive socket, then extra security-related processing may be required by the worker thread that would not be required if an unsecure connection request arrived. When the connection arrived on an SSL-enabled passive socket, this extra processing includes a handshaking protocol. The extra processing does not form part of the present invention. A number of ways may be used to pass information along to indicate the source of the connection, without deviating from the inventive concepts of the present invention. For example, the connection will have storage allocated to it to contain various types of information, as is known in the art. A parameter may be added to this data area to store the identifier of the incoming socket. The worker threads will each contain logic to check this data area to determine if any source-related processing is required. This enables any thread from the pool to process connections that arrive on any of the multiple passive sockets. Therefore, it is no longer required to allocate worker threads to passive sockets using a static partitioning. This embodiment accomplishes a dynamic partitioning of the pool to the various input sources, by having those sources merged onto the ready queue of the collector socket.

Use of the scheduling heuristic defined in the first preferred embodiment to schedule the requests from the collector socket's ready queue is optional for this second preferred embodiment. However, it's use enables avoiding the over-scheduling problem that would otherwise result when the connection load on the collector socket is less than the number of available threads.

Figure 6A:
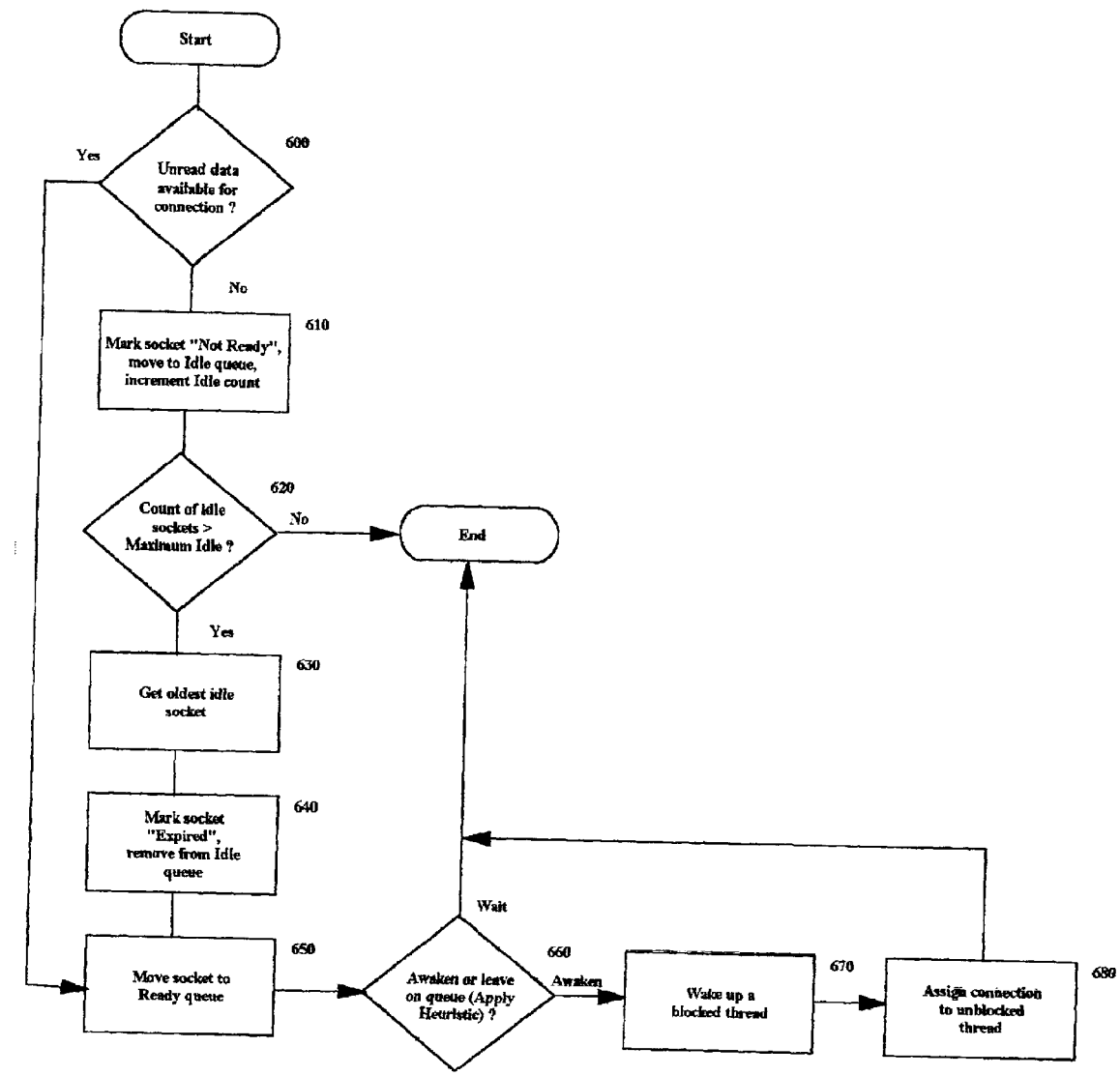
FIGS. 6A–6B illustrate flow charts which set forth the logic involved with the present invention to optimize assignment of threads to incoming requests when persistent connections are used.
Figure 6B:
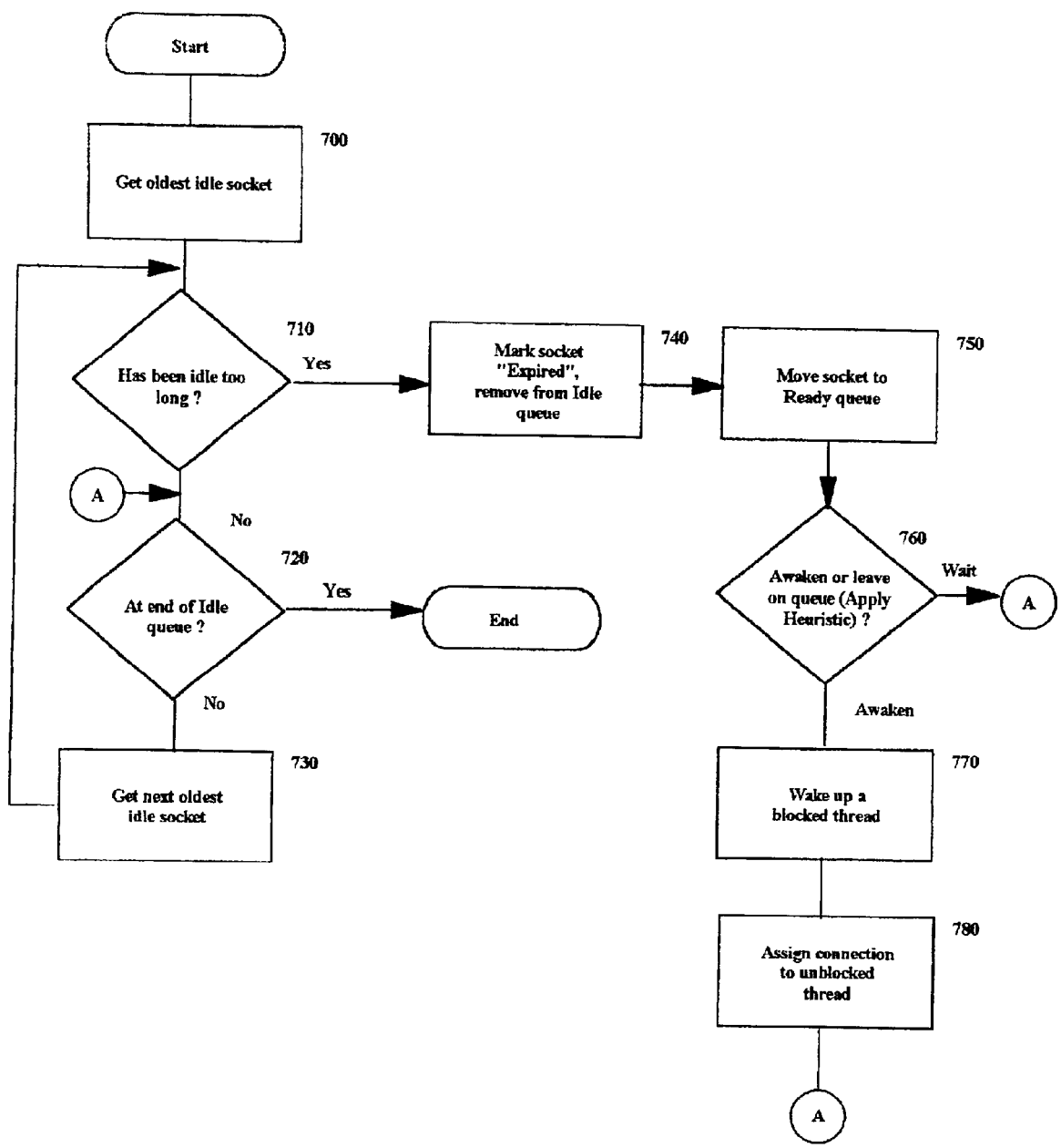

FIGS. 6A–6B illustrate flow charts which set forth the logic involved with a third preferred embodiment which alleviates the previously-discussed thread assignment with persistent connections problem.

The third preferred embodiment requires use of the collector socket defined according to the second preferred embodiment. Enhancements are defined for processing the collector socket that enable more efficient handling when persistent connections are used. In addition to the ready queue depicted in FIG. 5B, the collector socket now also has an "idle connections" queue. An additional API is defined, which is referred to herein as the "giveback" API (described below).

The processing logic by which worker threads receive work from the collector socket ready queue is identical to the process described above for the second preferred embodiment (which made reference to FIG. 3A). Worker threads are still assigned to only those connections that are on the ready queue of the collector socket.

The processing logic with which the receipt of incoming packets at the passive sockets is handled for this third preferred embodiment is similar to that described above for the second preferred embodiment (which made reference to FIG. 3B). However, a small number of changes are required. After Step 155 detects an incoming connection request, the new socket that is created at Step 160 now needs to have two additional data values initialized. First, a socket status must be set to indicate "Not Ready"—that is, this connection is not currently ready for scheduling. Second, an application context must be set to a null value, indicating that no context has been associated with this connection yet. The remaining changes pertain to the processing that is executed when data arrives for a connection. Instead of testing at Step 195 whether this is the first data packet received, the test now asks whether the socket is marked "Ready" or "Not Ready". If the status was already set to "Ready", control returns to Step 150; otherwise (i.e. the status was "Not Ready"), control continues to Step 200. Instead of the processing currently shown for Step 200, the new processing comprises: (1) marking the socket "Ready"; and (2) moving the socket from the current queue (which will either be the accepted queue of the passive socket, or the idle queue of the collector socket) to the ready queue of the collector socket.

The processing logic with which the ready connections queue of the collector socket is monitored, to ensure that no connection waits too long before being scheduled, is the same as that shown in FIG. 3C. The differences from FIG. 3C that were described for the second preferred embodiment also pertain to this third preferred embodiment.

When creating the collector socket, as was described for the second preferred embodiment with reference to FIG. 4, one additional change is required. An empty idle connections queue must now be created when the collector socket is being set up at Step 400.

FIG. 6A illustrates the logic that is invoked in response to issuance of the new giveback API by the application. This API call causes a socket that had been assigned to a worker thread (and had therefore already been receiving data) to be unbound from the thread, allowing the thread to be assigned to some other connection. This API will be invoked when a persistent connection experiences a delay (exceeding some predetermined threshhold) between incoming data requests.

Step 600 asks whether unread data is available for this connection. Data may have arrived as the giveback API was in process. When this condition is true, control transfers to Step 650. Otherwise, the process of moving the connection to the idle queue continues at Step 610.

Step 610 marks this socket as "Not Ready", and puts an entry for the socket onto the idle connections queue. A counter of the number of idle connections is incremented. An input parameter of the API, the application context value that is associated with this connection, is stored with the socket when it is put onto the idle queue. This enables the application to begin processing again, using the same socket, when data subsequently arrives.

At Step 620, the current value of the idle connections counter is compared to a maximum value (which may be set as a configuration parameter, or as a static value). If this test has a positive response, then too many connections are idle, and the oldest one will be removed by transferring control to Step 630. Otherwise, when the maximum has not been exceeded, the process of FIG. 6A ends.

At Step 630, the oldest connection on the idle connections queue must be removed. Preferably, the idle connections queue is a FIFO queue, so that Step 630 comprises pointing to the head of the queue. This connection will be closed down and the resources it was using will be freed up. Step 640 begins this process, by marking the socket to indicate that it has "Expired", and removing it from the idle queue. The count of idle connections is decremented, and at Step 650, the socket is moved to the ready queue. When the connection is scheduled from the ready queue to a worker thread, the close process will be completed by that worker thread. Steps 660 through 680 perform the scheduling heuristic that was described for the first preferred embodiment, whereby the connection will either be scheduled now by unblocking a thread, or wait to be scheduled when a busy thread becomes available and checks the ready queue of the collector socket (using the modified process of FIG. 3A). When Step 660 indicates that the thread will wait to be scheduled, or Step 680 has finished assigning the connection to an unblocked thread, the processing of FIG. 6A is complete.

The connection that has been put onto the collector socket's idle connections queue by use of this giveback API will remain there until one of the following conditions is met: (1) more data arrives, (2) a close connection request is received from the client, (3) the connection remains idle beyond a maximum time, or (4) the count of idle connections becomes too high. For condition 1, keeping the connection on the idle queue allows the connection to be assigned to a subsequent worker thread, without going through the initialization steps that are normally performed for a connection that is being scheduled due to receiving its first data request. The modified logic of FIG. 3B, described above for this third embodiment, detects the arrival of this additional data, and handles the rescheduling of the connection. Condition 4 is the process described above as Steps 620–680 of FIG. 6A. Conditions 2 and 3 are described in more detail below.

For condition 2, where the client requests that the connection be closed, the connection must be moved from the idle connections queue to the ready queue of the collector socket. This is because an application context was being maintained for the connection while it remained idle, which now needs to be closed out by a worker thread. The connection will move to the ready queue using the modified logic at Step 200 of FIG. 3B.

For condition 3, where the connection remains idle too long, the processing of FIG. 6B is used. The delay monitor (see FIG. 3C) that was used for the first and second embodiments, which checked to see if any connections had been on the ready queue too long, is still preformed for this third embodiment, as stated above. However, an additional monitoring procedure that checks the idle connections queue is also used, which is illustrated by FIG. 6B.

The processing of FIG. 6B is invoked at some predetermined interval, which may be a configuration parameter. A timer may be used to cause this invocation. At Step 700, the oldest idle socket from the idle queue is obtained. As stated, the idle connections queue is preferably a FIFO queue, so that Step 700 comprises pointing to the head of the queue. Step 710 tests whether this connection has remained idle too long. Each connection may have its own maximum idle period defined, by including a timeout parameter on the giveback API. This parameter value would be stored with the connection's entry on the idle queue. Alternatively, the same maximum idle time could be used for each connection, for example by specifying the value during configuration.

Control reaches Step 720 when the connection has not reached the maximum idle time. The connection will therefore be allowed to remain on the idle queue. Step 720 asks whether this was the last connection on the idle connections queue. If so, there are no more connections to check, so the process of FIG. 6B ends. Otherwise, Step 730 points to the next connection from the queue, and control returns to Step 710 to check this connection.

Control reaches Step 740 when the connection being checked has been idle beyond the maximum idle time. System resources are not being used efficiently by keeping an application context open for this connection when it has no data to send, so the connection will be closed down and the resources freed up. Step 740 begins this process, by marking the socket to indicate that it has "Expired", and removing it from the idle queue. The count of idle connections is decremented, and at Step 750, the socket is moved to the ready queue. When the connection is scheduled, the close process will be completed by the worker thread. Steps 760 through 780 perform the scheduling heuristic that was described for the first preferred embodiment, whereby the connection will either be scheduled now by unblocking a thread, or wait to be scheduled when a busy thread becomes available and checks the ready queue of the collector socket (using the modified process of FIG. 3A). When Step 760 indicates that the thread will wait to be scheduled, or Step 780 has finished assigning the connection to an unblocked thread, control returns to Step 720 to see if there are more connections on the idle queue to be checked.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. In a computing environment, computer readable code readable by a computer system in said environment, for enhancing performance of an application that services client connections using a plurality of worker threads, comprising:

a subprocess for moving client connections from a pending connections queue to a first queue when each of said client connections is accepted by said application and confirmed by a client that requested said client connection;

a subprocess for moving each of said client connections from said first queue to a second queue when an initial data packet arrives for said client connection; and a subprocess for assigning ones of said plurality of worker threads to said client connections on said second queue.

2. In a computing environment, computer readable code readable by a computer system in said environment, for enhancing performance of an application that services client connections using a plurality of worker threads, comprising:

a subprocess for receiving client connections on multiple pending connections queues;

a subprocess for moving said client connections from said multiple pending connections queues to first queues associated therewith as each of said client connections is accepted by said application and confirmed by a client that requested said client connection;

a subprocess for moving each of said client connections from said first queues to a single queue when an initial data packet arrives for said client connection; and a subprocess for assigning ones of said plurality of worker threads to said client connections on said single queue.

3. Computer readable code for enhancing performance of a multithreaded application according to claim 2, wherein said subprocess for assigning further comprises:

a subprocess for assigning said ones from a group of active worker threads comprised of changeable ones of said plurality of worker threads, and having a changeable number of said changeable ones, said changeable number being at least one, by using a scheduling heuristic that balancing said changeable number in said cative group against a current workload comprised of said client connections on said single queue.

4. A system for enhancing performance of an application that services client connections using a plurality of worker threads in a computing environment, comprising:

means for moving client connections from a pending connections queue to a first queue when each of said client connections is accepted by said application and confirmed by a client that requested said client connection;

means for moving each of said client connections from said first queue to a second queue when an initial data packet arrives for said client connection; and means for assigning ones of said plurality of worker threads to said client connections on said second queue.

5. A system for enhancing performance of an application that services client connections using a plurality of worker threads in a computing environment, comprising:

means for receiving client connections on multiple pending connections queues;

means for moving said client connections from said multiple pending connections queues to first queues associated therewith as each of said client connections is accepted by said application and confirmed by a client that requested said client connection;

means for moving each of said client connections from said first queues to a single queue when an initial data packet arrives for said client connection; and means for assigning ones of said plurality of worker threads to said client connections on said single queue.

6. The system for enhancing performance of a multithreaded application according to claim 5, wherein said means for assigning further comprises:

means for assigning said ones from a group of active worker threads comprised of changeable ones of said plurality of worker threads, and having a changeable number of said changeable ones, said changeable number being at least one, by using a scheduling heuristic that balances said changeable number in said active group against a current workload comprised of said client connections on said single queue.

7. A method for enhancing performance of an application that services client connections using a plurality of worker threads in a computing environment, comprising the steps of:

moving client connections from a pending connections queue to a first queue when each of said client connections is accepted by said application and confirmed by a client that requested said client connection;

moving each of said client connections from said first queue to a second queue when an initial data packet arrives for said client connection; and assigning ones of said plurality of worker threads to said client connections on said second queue.

8. A method for enhancing performance of an application that services client connections using a plurality of worker threads in a computing environment, comprising the steps of:

receiving client connections on multiple pending connections queues;

moving said client connections from said multiple pending connections queues to first queues associated therewith as each of said client connections is accepted by said application and confirmed by a client that requested said client connection;

moving each of said client connections from said first queues to a single queue when an initial data packet arrives for said client connection; and assigning ones of said plurality of worker threads to said client connections on said single queue.

9. The method for enhancing performance of a multithreaded application according to claim 8, wherein said assigning step further comprises the step of:

assigning said ones from a group of active worker threads comprised of changeable ones of said plurality of worker threads, and having a changeable number of said changeable ones, said changeable number being at least one, by using, a scheduling heuristic that balances said changeable number in said active group against a current workload comprised of said client connections on said single queue.

* * * * *